United States Patent [19]

Heinrich et al.

[11] Patent Number: 4,714,257
[45] Date of Patent: Dec. 22, 1987

[54] ANNULAR SLIDING BODY FOR A SLIDING SEAL AND PROCESS FOR USE THEREOF

[75] Inventors: Juergen Heinrich, Schoenwald; Axel Krauth, Selb; Karl-Heinz Victor, Castrop-Rauxel; Heinz Peeken, Aachen, all of Fed. Rep. of Germany

[73] Assignees: Hoechst Ceramtec Aktiengesellschaft; Pacific Wietz GmbH & Co. KG., both of Fed. Rep. of Germany

[21] Appl. No.: 568,122
[22] PCT Filed: Apr. 8, 1983
[86] PCT No.: PCT/EP83/00100
§ 371 Date: Dec. 9, 1983
§ 102(e) Date: Dec. 9, 1983
[87] PCT Pub. No.: WO83/03651
PCT Pub. Date: Oct. 27, 1983

[30] Foreign Application Priority Data

Apr. 10, 1982 [DE] Fed. Rep. of Germany ....... 3213378

[51] Int. Cl.$^4$ .............................................. F16J 15/34
[52] U.S. Cl. ........................................... 277/1; 277/2; 277/70; 277/75; 277/80; 277/81 R; 277/81 S; 277/96.1; 277/96.2; 277/201; 277/233; 277/DIG. 6
[58] Field of Search ............... 277/3, 16, 22, 13, 14 R, 277/75, 95, 1, 201, 202, 215, 96, 96.1, 233, 234, 80, DIG. 6, 81 R, 96.2, 69, 68, 2, 227, 70, 81 S

[56] References Cited

U.S. PATENT DOCUMENTS

| | | | |
|---|---|---|---|
| 2,646,999 | 7/1953 | Barske | 277/3 X |
| 2,919,943 | 1/1960 | Kimm | 277/80 |
| 2,941,824 | 6/1960 | Hoyer | 277/201 X |
| 3,068,014 | 12/1962 | Wilkinson | . |
| 3,093,382 | 6/1963 | Macks | 277/96.1 X |
| 3,128,104 | 4/1964 | Teske | 277/80 X |
| 3,186,721 | 6/1965 | Petri | 277/22 X |
| 3,529,905 | 9/1970 | Meginnis | 277/96 X |
| 3,637,222 | 1/1972 | Wilkinson | 277/3 X |
| 3,874,680 | 4/1975 | Mustoe et al. | . |
| 4,157,835 | 6/1979 | Kahle et al. | 277/215 X |
| 4,171,818 | 10/1979 | Moskowitz et al. | 277/80 |
| 4,189,158 | 2/1980 | Roussin | 277/95 X |
| 4,290,613 | 9/1981 | Scott | . |
| 4,415,317 | 11/1983 | Butterworth | 277/96.1 |

FOREIGN PATENT DOCUMENTS

| | | |
|---|---|---|
| 2436920 | 4/1980 | France . |
| 413522 | 12/1966 | Switzerland . |
| 1418663 | 12/1975 | United Kingdom . |
| 1454423 | 11/1976 | United Kingdom . |

OTHER PUBLICATIONS

Werdstoffauswahl Bei Gleitringdichtungen, Technica, vol. 17, No. 6, pp. 339-342, Mar. 1961; Nebesky.
"Burgmann Gleitringdictungen" (a brochure).
VDI–Zeitshrift, vol. 102, No. 18, Jun. 1960; Mayer ASLE Education Course, Fluid Film Sealing, Mueller, Topic IX (1972).

Primary Examiner—Allan N. Shoap
Attorney, Agent, or Firm—Schwartz, Jeffery, Schwaab, Mack, Blumenthal & Evans

[57] ABSTRACT

The invention concerns a sliding body for sliding systems in which sliding surfaces of sliding and counter components form a gap in which there is a fluid, whereby the sliding body (1) at least in the area of sliding surfaces (10) is comprised of several stacked thin form elements stamped out of foils or cards, which are solidly bonded together on the contact faces. The invention also concerns a process for the production of the sliding body, whereby foils are produced from ceramic slips, in which various hollow chambers and/or recesses are stamped or impressed, a laminating agent is applied to the foils or cards, the foils or cards are stacked into a sliding body packet and the layers of the stack are laminated together, the organic components are partially baked off, after which a post-treatment of the sliding body takes place, then the remainder of the organic components are removed, and then the laminated sliding body is sintered between 1200° and 2200° C., after which an optional post-treatment takes place. The novel sliding body is used especially for production of hydrodynamic enhancement shapes in the sliding surface.

41 Claims, 14 Drawing Figures

ANNULAR SLIDING BODY FOR A SLIDING SEAL AND PROCESS FOR USE THEREOF

BACKGROUND OF THE INVENTION

This invention relates to a sliding body, particularly one of ceramic material, used for sliding systems, particularly for sliding ring-type seals.

Axial and radial sliding ring-type seals serve as a rule for sealing rotational machine parts against fluids (liquids or gaseous media), and in most instances consist of a stationary ring and a rotating sliding ring, these being pressed together by means of a spring element. These sliding rings from a seal gap in which the sliding surfaces of the sliding rings are arranged opposite to each other. When the seal is in operation there is a liquid sealing medium in the seal ring and this is under a pressure difference.

It is possible, for example, to use axial sliding ring-type seals that ensure a hydrostatic-hydrodynamic seal in difficult applications. The pressure of the check and lubricating liquids is controlled by virtue of a suitable arrangement so that the sealing is relieved hydrostatically and can become operative even in the event of a high internal pressure. In addition, so called hydrodynamic enhancement depressions are provided at least in the surface of a sliding face of the slide rings (DE-AS 14 75 621). In known depressions this involves blind drillings of equal depth and equal diameter, arranged equidistantly along a circle and which work together with open-rim grooves. These depressions are intended to ensure lubricant dispersal since a hydrodynamic lubricant and carrier effect is stopped. The non-optimal effect of these known depressions is improved in accordance with DE-PS 29 28 504 by the fact that the individual hydrodynamic enhancement depressions are of alternating depths at a depth periodicity that increases and decreases periodically along the circumference. Such an arrangement can only be effected at considerable cost and providing non-brittle materials are used since the production of depressions of this kind in brittle materials is practically impossible. Furthermore, like all other familiar arrangements, the familiar arrangement cannot be adapted to changing loads that may occur during the operation of a sliding ring-type seal.

A sliding ring-type seal should have good emergency running characteristics and be resistant to aggressive fluids. In addition, it must be able to withstand the temperatures that may occur during operation.

Special measures to cool the sliding rings will be necessary in the event of high pressures and temperatures. In this connection, it is an already familiar fact that cooling medium channels can be provided in the sliding ring bodies, these being capable of conducting a cooling medium (Swiss patent 413 522). However, it is extremely difficult and costly to incorporate such channels and, in particular, is possible only at extremely great cost in the case of ceramic materials.

SUMMARY OF THE INVENTION

It is the task of this invention to simplify the production of sliding bodies, particularly sliding rings, and to create versatile sliding rings that can satisfy practically all demands in optimal fashion.

This task is achieved by providing a sliding body, particularly for sliding ring-type seals in which sliding surfaces of sliding and counter components form a gap in which there is a fluid, wherein said sliding body comprises a plurality of stacked thin form elements bonded together solidly at contacting faces.

According to a preferred aspect of the invention, there is at least one chamber immediately beneath the sliding surface, and preferably there are several chambers arranged next to each other in a common plane underneath the sliding surface, said chambers being covered by a thin, flexible membrane which can be formed of a plurality of layers of ceramic foils and which membrane preferably also forms the sliding surface and which can be elastically deformed to produce a hydrodynamic effect.

According to another aspect of the invention, the sliding body of the invention is produced by a process comprising producing foils form ceramic slips, stamping cutouts or impressing recesses in desired foils, applying a laminating agent to the individual foils, thereafter stacking the foils to form a stacked body, heating the stacked body to drive off organic components, and then sintering the body at a temperature between 1,200° and 2,200° C.

According to a particularly preferred aspect of the invention, the sliding surface of the sliding body is configured to produce a hydrodynamically enhanced spacial form.

Further preferred embodiments of the invention are the subject matter of dependent claims.

The use of ceramic foils as sliding bodies entails unexpected advantages and effects, formerly unknown. Whereas up to now more or less monolithic blocks have been used for the basic bodies, e.g., of a sliding ring, this invention breaks with this principle and proposes that the sliding ring be built up, at least in part, of laminate-like, preferably flexible, elastically deformable foil rings. Foils that are particularly suitable for the purposes of this invention are ceramic foils described, for example, in DE-AS 23 57 625 and U.S. Pat. No. 3 870 776, or in European Pat. No. 00 364 35. Formerly these have been used for completely different purposes, e.g., for housings used to accommodate electronic circuits.

The advantages achieved by this invention lie, for the most part, in the fact that enhanced hydrodynamicity is possible as a result of temperature and/or pressure control at the sliding surfaces.

In addition to ensuring improved hydrodynamic running characteristics, on the one hand it will be possible to achieve less wear; on the other, the slightest possible leakage particularly at the gap, is achieved by the deliberate total deformation. The hydrodynamicity is made possible by the measures provided for by the invention, on the one hand by the elastic and preferably changeable deformation of the covering over the hollow chamber that is optionally placed beneath the sliding surface and/or at the cut-outs arranged on the inner or outer diameter; further, by deliberate cooling and heating processes as well as by assigned over or under pressure in the hollow chambers.

The process according to this invention for the production of complex sliding bodies by means of foil technology entails, amongst others, the advantage that it becomes possible to move the hollow chambers as close as possible to the sliding surfaces at relatively low labour costs, and by the fact that one is not subjected to any design restraints since even undercut chambers or cutouts, respectively, can be produced using this technology. In particular, complex channels or chambers, respectively, as well as extremely complex outlines for the sliding body can be produced by stamping and pressing the foils without incurring any great expenses.

BRIEF DESCRIPTION OF THE DRAWINGS

Specific embodiments of the invention will now be described with reference to the accompanying drawings in which.

DETAILED DESCRIPTION OF PREFERRED EMBODIMENTS

Figure 1:
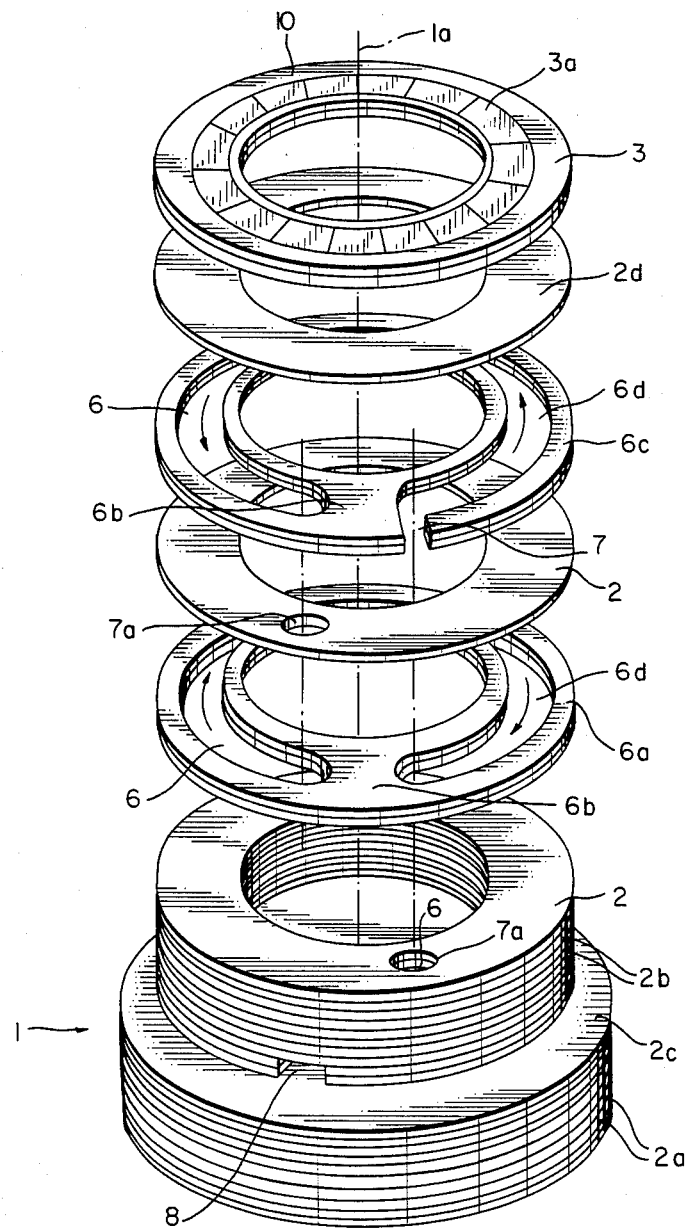
FIG. 1 is an exploded view of a sliding body, this having a stamped hollow chamber and impressed sliding surfaces.

The novel new construction of the sliding body 1 that is configured as a sliding ring can be seen from FIG. 1. The sliding ring consists of thin foil rings 2a, 2b these being arranged one on top of the other concentrically to the axis 1a and being bonded to each other on the contact surfaces. This leads to the fact that the internal spaces of the rings 2a, 2b from the passages, e.g., for the shaft (not shown) that is to be sealed, whereas the outer shapes of rings 2a, 2b form the outer shape of the sliding ring 1. As an example, the rings 2a are of a greater external diameter than the rings 2b, this leading, for example, to the formation of a axial support surface 2c.

In its simplest form the sliding ring 1 consists only of the foil rings 2d, which are simple to produce, simple to stack one on top of the other, and which can be bonded to each other to form a solid body.

The use of foils particularly ceramic foils, entails the particular advantage, however, that the rings can have recesses or depressions or impressions of any desired shape and these can be incorporated without any particular expense. These recesses or deformations, respectively, can be, for example, the through holes 7a, for example, in ring 2, or the partially circular arc-shaped stamped-out portions 6d or suitably formed impressions or completely circular cut-outs or outlets 7. The rings with the cut-outs and/or impressions can be arranged on top of each other in such a manner that at least one, for example, annular chamber 6 having an inlet opening 8 and outlets 7 is formed in the sliding ring body 1.

Figure 2:
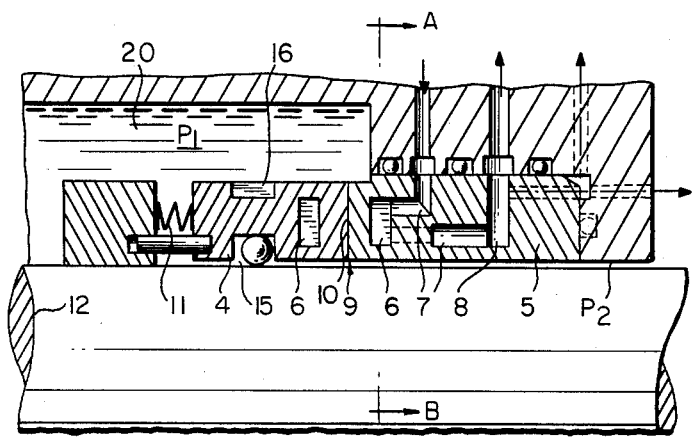
FIG. 2 is a radial section through a sliding ring-type seal having hollow chambers in the sliding and/or counter ring.

In the example shown in FIG. 2 the rings 2b form an annular chamber having an inlet opening 8 and a through hole 7a. A ring 6a having a segmentally shaped cut-out portion 6d that is interrupted by a solid portion 6b can be placed over the ring 2 with the through hole 7a. The ring 6a is arranged above the through hole 7a in such a manner that the hole 7a is located on the right hand side of and adjacent to the solid portion 6b. The cut-out portion 6d is covered by a ring 2 that is arranged on the ring 6a, and this ring 2 also has a through hole 7a that is, however, so positioned, that the hole 7a is located on the left hand side of and adjacent to the solid portion 6b. A ring 6c is arranged above the ring 2 and this also has a segmentally shaped cut-out 6d and, in addition to this, an outlet opening 7 that is located to the right and adjacent to solid portion 6b. The cut-out 6d of the ring 6c is covered by a ring 2d that has no cut-out portion and which is arranged on ring 6c; it is preferred that still another ring 3 having hydrodynamic enhancement depressions 3a is arranged on the ring 2d. It is preferred that the depressions are impressed. The membrane in FIG. 1 is thus a composite of rings 3 and 2d. Using such an arrangement of the rings a fluid can flow, for example, through the inlet opening 8 and into the chamber in the area of the rings 2b, through the hole 7a in ring 2 into the chamber formed in ring 6a and then from this chamber through the through hole 7a of ring 2 into the chamber of ring 6c and then leave through the outlet opening 7.

It is possible to have other chamber configurations and sizes and other connecting holes as well as other arrangements of the chambers and the joining elements, because the cut-out portions and/or the impressions in the rings can be achieved by simple stamping or impression methods. If foil rings are used it is possible, first of all, to configure any sort of flow paths, e.g., offset paths, which was formerly impossible to do but which, however, ensure the optimal throughput of the fluid. The tier arrangement of the chambers in an axial direction permits a plurality of chambers, even ones of different heights. In the same way, the circumferential extent of the chambers can also be varied in that, for example, more and/or longer or shorter solid portions 6b can be provided. The shape and depth of the hydrodynamic enhancement impressions 3a can also be of any kind since there are no limits on the impression of such configurations.

The novel sliding body 1 has, for example, an external diameter of 50 mm and an internal diameter of 40 mm. The stamped foil rings are 0.8 mm thick and the ring 3 is 1.6 mm thick. The width of the hollow chamber amounts to 3 mm. The chambers can be filled with a fluid that is of a high or low temperature. Insofar, the sliding bodies can be either heated or cooled. The construction of a sliding body of this type is achieved by stacking the individual foil rings on top of each other and by a subsequent lamination process.

A practical application of the sliding body can be seen in FIG. 2, which shows an alternate embodiment of a sliding ring-type seal having hollow chambers 6 in the sliding ring 4 and the counter ring 5. The shaft 12 is associated with the sliding ring seals 4 and 5 and the sliding ring 4 rotates on this shaft and is sealed to the shaft 12 in a suitable manner. On the other hand, the counter ring 5 is arranged so as to be stationary and is likewise sealed to the housing in a suitable manner. The sliding ring 4 and the counter ring 5 are in the main of ceramic materials; infiltrated silicon carbide is particularly suitable as material. Aluminum oxide ceramics comprising more than 94%-wt of $Al_2O_3$ and the balance sintering agents MgO, CaO, $SiO_2$ and zirconium oxide, are further suitable materials. Other suitable materials are glass ceramic and hard materials such as, for example, Tungsten carbide and other hard metals, sintering metals, metals and graphite. All types of metallic helical spings, bellows springs of metal or rubber and other elastic rubber parts can serve as the spring element 11, as can magnetic components. In the seal gap 9 between the sliding surfaces 10 there is normally a hydraulic sealing agent which in most cases is the fluid that is to be sealed itself and which is under radial pressure difference. The hollow chambers 6 themselves can be of any of a multitude of configurations according to whether they are provided for pressurizing or heating the surrounding fluid 20. The inlet openings 7 and the outlet openings 8 serve for the appropriate movement of the surrounding fluid 20. Furthermore in the illustrated example of a sliding ring-type seal there is a radial pressure difference whereby according to operating conditions P1 can be greater than P2.

A further embodiments of the invention will be described with reference to FIGS. 3 to 10 which make it possible to vary the hydrodynamic enhancement effect. It is known that the hydrodynamic enhancement effect can be affected by the characteristics of the fluid in the gap 9, by the size of the pressure difference between P1 and P2, and by the configuration and arrangement of the depressions, as well as by temperature. Of these, at all events during the operation of the seal it is temperature and within certain limits the type of fluid and the pressure difference that can be varied during operation. However, it has been shown that these variables have no radical effect and it is principally the hydrodynamic enhancement depressions that are of particular importance for the hydrodynamic effect. For this reason, for example, according to DE-PS 29 28 504 it has been proposed that a "ripple effect" be incorporated in the depressions by means of periodically alternating depths. This particularly costly configuration may it is true, bring about certain improvements within certain limits, these limits are however far too narrow.

By contrast, the invention breaks completely new ground and provides for the fact that directly beneath the silding surface 10 of a sliding ring 4 and/or a counter ring 5 there are at least two and preferably more than two chambers 6 arranged adjacent to each other with a relatively thin membrane layer 10a covering the chambers, said membrane layer being both flexible and elastically deformable. This deformation can be produced by an over pressure or under pressure that is effective in the chambers or can be effected by means of a over pressure or under pressure that acts through the gap 9, in which regard this deformation can produce an elevation as well as a depression and in place of an elevation a depression. When this is done, it can be ensured, for example, that there are different pressures in different chambers so that for the same configuration of the membrane layer 10a different deformations can occur and/or adjacent chambers or chambers that are located at a distance from each other can be covered with a membrane layer 10a which can also be of varying elasticity so that various deformations can occur in the chambers at different times at the same pressure.

It is preferred that these deformations can be influenced externally, e.g., by the adjustment or by change of the pressure, at which, for example, a fluid is forced through the chambers 6, or by change in the temperature of the fluid in the chambers. The changes can be made, for example, periodically, in which regard it can also be arranged that a membrane over a chamber can be pushed outwards and/or pulled inwards so that a bulge or a depression will result.

In an especially simple manner this invention can be realized by using a foil as the membrane layer 10a that covers the chambers 6 in the sliding body 4, 5. The use of a ring of a ceramic foil is preferred. It may also be provided that the ring in the area of the sliding surface 10 have dynamic enhancement depressions impressed therein. The basic body of the sliding or counter ring, respectively, can consist of a massive body. However, a buildup of the basic body according to FIG. 1 is preferred in which regard it is particularly advantageous to use rings of a ceramic foil. In this connection, it can also be arranged that rings of ceramic foils that are of different compositions are used.

Figure 3:
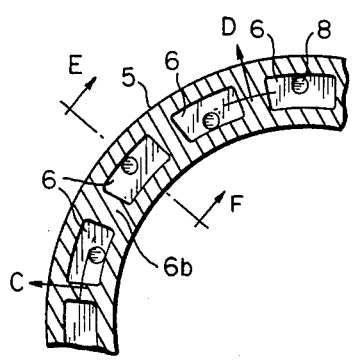
FIG. 3 is a section on the line A-B of FIG. 2 with hollow chambers in plan view.

Further examples will be described with reference to FIGS. 3 to 10. FIG. 3 shows, for example, a counter ring body 5, in which there are several adjacent chambers 6 these being separated by the solid portions 6b. Preferrably, every chamber 6 has an inlet opening 8, through which a fluid can be introduced. The outlet openings are not shown in FIG. 3 but they can however be provided. Furthermore, several chambers can be connected to each other by means of a passage (not shown). The chambers are covered over with a foil ring 10a (FIG. 4), the outer surface of which forms the sliding surface 10 of, for example, the counter ring.

Figure 9A:
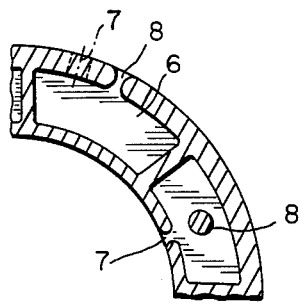
FIGS. 9a, 9b, 9c, and 9d show variant embodiments in axial section along a line corresponding to the line K-L of FIG. 8.

Sectoral control of the hollow chambers 6 with over pressure or under pressure in relation to the current ambient pressure, or by means of cooled or heated liquids brings about circumferential or radial rippling on the sealing surface 10 as a result of the elastic, membrane-like deformations in the foil ring 10a. Thus in the case of counter-rotational movement this will cause a hydrodynamicity in the seal gap 9 between the sliding ring 4 and the counter ring 5 and this will have a load reducing and friction reducing effect on the sealing sliding surfaces 10 that are pressed together because of the effect of the pressure difference P1 and P2 and the pressure of the spring. It has been shown to be particularly advantageous that external control can be exerted on the seal gap 9 and thus on the frictional behaviour and the sealing behaviour by means of constructive measures, in the event that changing loads brought about by operating conditions make this necessary. Thus a sliding body 1 can be adapted as required to existing operating conditions by changing the spatial form of the sliding surfaces and thus by a degree of hydrodynamicity that can be adjusted in magnitude. As shown in FIG. 9a, the individual hollow chambers 6 can also have connections for the inlet openings 7 and the outlet openings 8.

Figure 4:
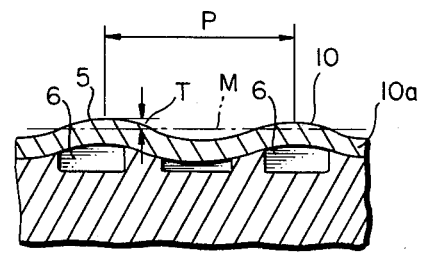
FIG. 4 is a cross-section along the curved line C-D of FIG. 3, the sliding surface being rippled.

FIG. 4 shows at a greatly enlarged scale the wave or rippling T, which is produced on the sliding surface 10, and which is caused by the rippled shaping action of the membrane layer 10a, if the hollow chambers 6 are affected as here described, or if the membrane layer 10a is subjected to partially differentiated forces. The periodic angle P of the wave can be adapted to the load conditions in the same way, and the height or depth, respectively of the waves can be selected as desired. It is preferred that a periodic angle P of 90° is selected. M denotes a surface contour of the sliding surface which, for example, is produced by lapping and polishing. A specifically produced circumferential wave T can be applied to this surface contour M in the context of this disclosure.

Figure 5:
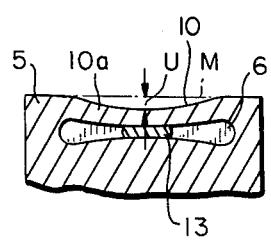
FIG. 5 is an enlarged cross-section on the line E-F of FIG. 3 through a hollow chamber with support.

A supporting element 13 is arranged in the hollow chamber 6 as can be seen from FIG. 5. This can be installed in any form and acts as a support for the membrane layer 10a that is depressed by the distance U and thereby delimits the depression. This supporting element 13 can be installed either on the base or the top of the hollow chamber 6.

Figure 6:
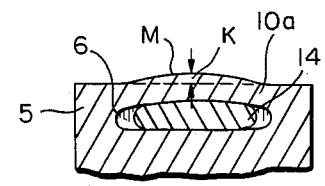
FIG. 6 is an enlarged cross-section through the hollow chamber of FIG. 5 with an electronic component.

According to a further feature as in FIG. 6 there is an electronic component 14 in the hollow chamber 6 and this can serve various ends. It can serve, for example, for heating of the surrounding or outside fluid 20, respectively, as desired and it can also be so configured so that it expands when heated and shrinks when cooled, whereby these movements will be replicated by the membrane layer 10a.

Sensors can also be installed in the hollow chambers or recesses, which provide signals carrying many types of information concerning operating life and operating safety and which will thereby influence control of the sliding surfaces.

As an example, magnets can also be installed in the hollow chamber; on the basis of requirements signalled from adjacent other hollow chambers depending on operating performance of the sliding ring-type seal these can be made to act on the sealing surfaces so that relieving or loading forces can be exerted on the membrance layer 10a. Both the supporting elements 13 and the electronic components 14 can function so that the edge zones can be influenced and thus exert a considerable effect on the seal behaviour of the sliding ring-type seal. The surface contour M, which depends upon the foil production process, can be reconfigured with the help of the electronic components 14 from a trough to a peak K.

Figure 7:
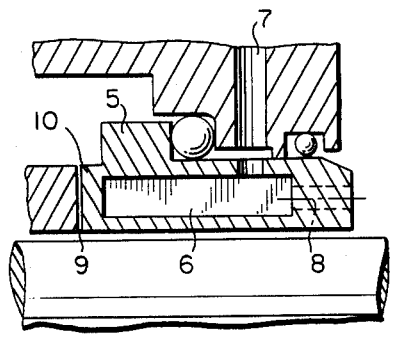
FIG. 7 is a radial section through the counter ring with a sliding ring arrangement.

FIG. 7 shows a further possible embodiment for the configuration of the sliding ring 5 with respect to the inlet openings 7 and outlet openings 8. The openings 7, 8 can be formed as sectors at any angle and in any form in the chambers 6.

Figure 8:
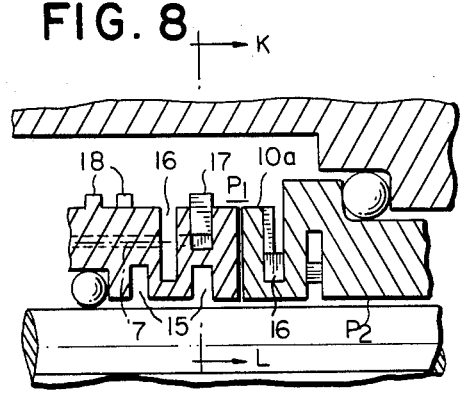
FIG. 8 is a radial section through a sliding and counter ring with surrounding cutouts.

In a further embodiment illustrated in FIG. 8 cut-outs 15, 16 can be made in the sliding body 1 in addition to or in place of the hollow chambers 6, arranged to extend entirely or only partially around the internal diameter and/or the external diameter. These cut-outs or similar recesses can contribute to the production of the deformations on the sliding surfaces. However, the complex spatial shape of a sliding body of this kind cannot be produced unless foils, particularly ceramic foils, are used. When this is done the cut-outs 15, 16 can be arranged in any manner or at least in any displaced vertical planes and can be of any required depth with regard to radial extent. The axial extent of the cut-outs 16 can be matched to requirements. In the same way, ribs 17 can also be provided. The circumferential wave that is required for hydrodynamic performance will be produced by the pressure of the sealing medium P1/P2 that is to be sealed off, in which regard the degree of deformation of the sliding surfaces in the sense of an optimal sliding ring-type seal can be predetermined by varying the stiffness of the walls of the sliding body. In an ideal case with increased sealing pressure the hydrodynamicity will increase as a result of the elastic behaviour of the sliding and/or counter rings and thus friction will decrease and contact friction and wear on the surfaces 10 will be avoided. The channels 7 can also be of varied shapes. They can serve as feed channels, for example, for the sealing fluid or for the circulating system or can be used most expediently for cooling or heating the sliding ring surfaces.

Figure 9B:
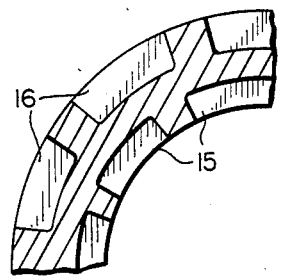
Figure 9C:
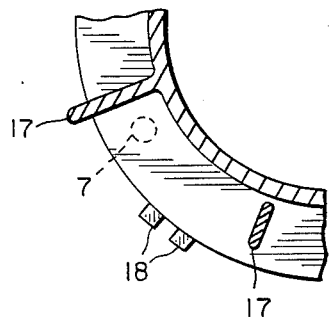
Figure 9D:
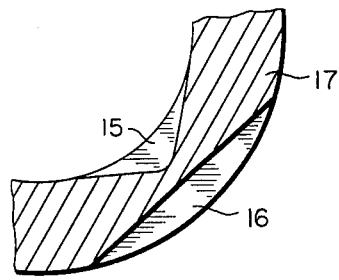

Further variations with regard to the cut-outs 15 and 16, ribs 17, and pegs 18 can be seen in plan view in FIGS. 9b, 9c, and 9d. There can be open edge hollow chambers 16 on the outer diameter or, on the other hand, open edge hollow chambers 15 on the inner diameter. Ribs 17 that are installed in the cut-outs 16 may be of very varied shape and these ribs 17 can completely fill the width of the cut-out. Such ribs 17 can however protrude beyond the external diameter of the sliding body and can serve for recirculating an ambient or external fluid 20. The pegs 18 on the external diameter which, amongst other things, can be displaced from one foil layer to another foil layer so that a multiple helical thread results, can then be used as a pump thread whereby once again the external or ambient fluid 20 will be circulated.

Figure 10:
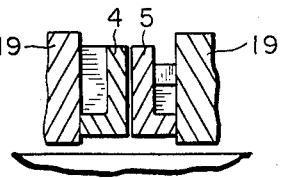
FIG. 10 is a radial section through a portion of a sliding and counter ring having a bonded construction.

FIG. 10 shows partial areas of sliding rings 4 and counter rings 5 as a further exmaple when only the nearest region of the sliding ring seal 4,5 is provided with the features of the invention. To this end disc like rings are configured and then applied to a carrier body 19 as a bonded structure, for example by cementing, soldering, shrink fitting or by various other mechanical methods.

Figure 11:
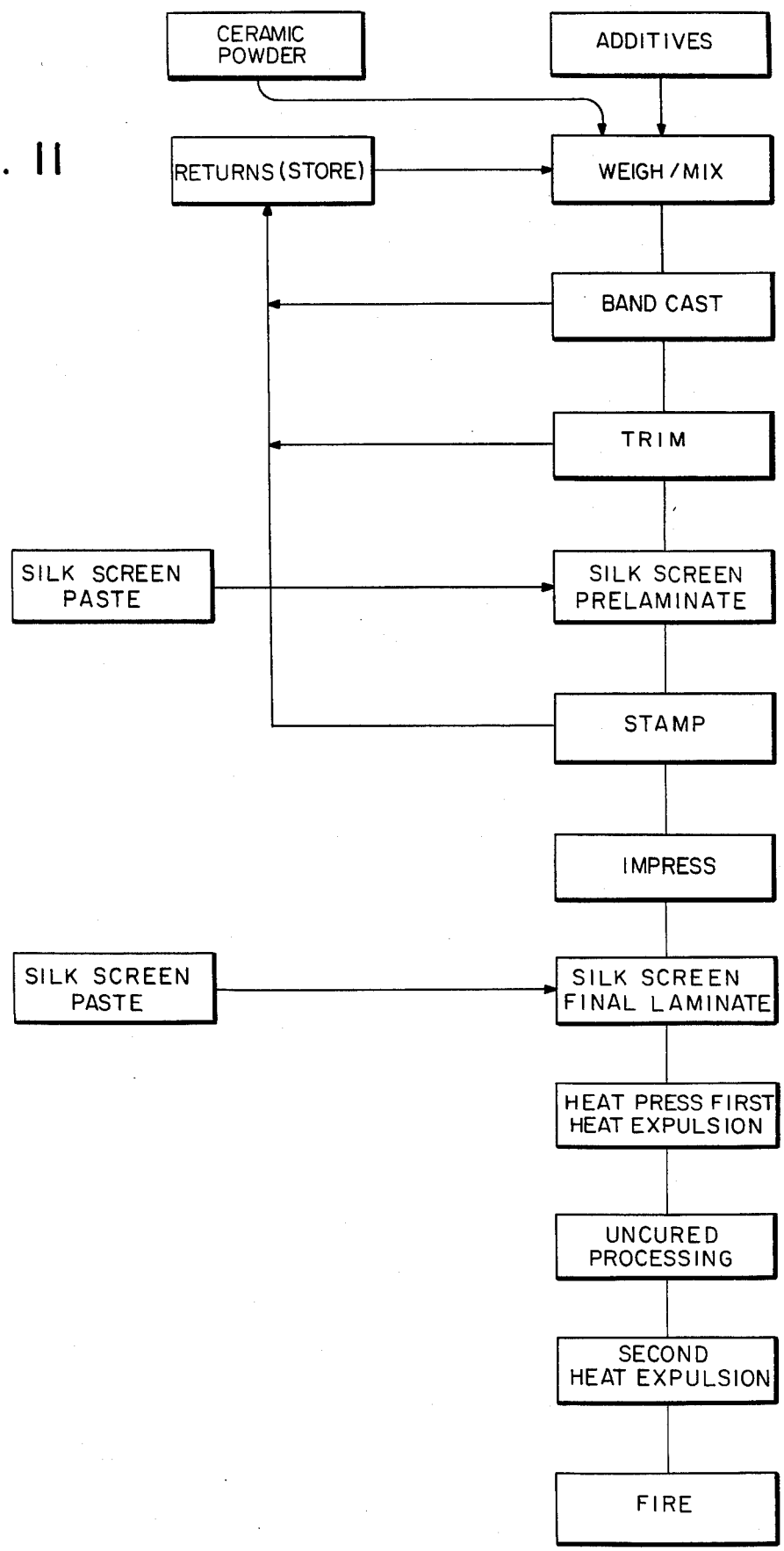
FIG. 11 is a flow chart for the novel process used to produce a sliding ring.

FIG. 11 shows the flow chart producing the novel sliding body. Conventional slips are used for the production of the foils. These foils consist of suitable powders mixed with organic binders, dispersal and diluting agents and, optionally, softening agents and other substances in the form of oils. Water or organic solutions such as, for example, ethanol, toluene- and trichlorethylene serve as dispersion and diluting agents for the organic binding agents. Particularly suitable recipe for the production of the foils can be seen from the following table in which the slip recipes consist of the powders and binders or solvents, respectively.

TABLE 1

| Material | Preferred Range (%-wt) | Special Example (%-wt) |
|---|---|---|
| Powder | 60–70 | 65 |
| Binder | 7–10 | 8 |
| Solvent | 23–30 | 27 |

The viscosity of the slip can be influenced particularly by the solvent content. It has also been found that the use of ultrasound is advantageous in the preparation of the casting slip. If this treatment is used it is possible to obtain a casting slip that is extremely homogenous, displays better casting characteristics, and has a maximum content of solids, which has a particular effect on the unprocessed thickness of the foil. In this way it is possible to obtain foils having greater packing thickness and improved mechanical characteristics. Furthermore, it is useful to attach a vibrator to the casting band since this will consolidate the casting slip even more or permit a more even foil thickness over the whole of the band width.

According to this process the foils are brought to finished size after lamination. If thick foils or extremely high cut-outs are required which extend beyond the 0.1 to 1.5 mm thickness of the foil, the foils will be bonded into individual cards with a laminating agent in a pre-laminating process. The different cut-outs will then be stamped out from these cards, or the foils will be subjected to an impression process, respectively. In the latter case the matrices will be exposed to temperatures of 20° to 120° C. and pressures of 5 to 100 bar which will result in comb-like projections on the foils. The stamps or impressed cards are then built up to form a sliding body and the lamination of the individual layers will take place with the help of a laminating process. During the lamination process a press is used at pressures of 0.1 to 15 bar, preferably 1 bar, and for time intervals from 1 to 10 seconds.

Normally, work is carried out at room temperature although temperatures of up to 100° C. can also be used. In particular the pressure is adjusted according to the organic content and the type of laminating agent. In the laminating process, use is made of either a paste that preferably contains a filler or pure organic cement which can be applied by silk-screening, spraying or rolling. The use of a laminating agent entails several advantages and will permit the use of lower pressures during the laminating process, which will help avoid any deformation of the hollow chambers. Rippling of the foils can be evened out and finally the use of a laminating agent effectively reduces laminating errors. Finally, heating takes places to drive off the organic component up to 40 to 60% of the plastic content, which leads to an additional green strength. This means that the sliding body will be easy to work without the tools becoming fouled by the organic components. The remaining organic components are then driven off by heating and the sliding body is sintered between 1200° and 2200° C. In certain cases further processing in the form of grinding, lapping and polishing will be required.

An embodiment of the novel process will be explained by way of example. The sliding body consists in this case of infiltrated SiC. For the production of the ceramic casting slip 90%-wt of SiC powder, 10%-wt of graphite powder, 24%-wt of ethanol, 10%-wt of toluene, 1%-wt of menhaden oil, 8%-wt of polyvinylbutyral and as plasticiser 5%-wt of palatinol and/or ucon oil are added.

This mixture is then ground for twenty hours in a drum mill with $Al_2O_3$ pellets and the slip is finally subjected to vacuum. The usual drawing of the slip for foil production takes place on a steel band. The slip is added through a casting shoe, in which regard the thicknes of the foil can be determined by means of an adjustable gap height of 0.2 to 1.5 mm at the casting shoe. The foil is then drawn off the steel band and cut into units. It has been found to be advantageous to build up so-called cards from two to three foils. The combination of the individual foils is achieved by spraying or applying, a laminating agent. In the latter case a paste consisting for example of 90%-wt of SiC and 10%-wt of graphite is used. Furthermore the paste contains 20–40%-wt of unsaturated alcohols and 3–20%-wt of binder that contains a plasticiser and polyvinylbutyral. In such a case the paste is applied by a silk-screen process. At the same time surface irregularities are evened out by the solids content in the paste. In a like manner there is a surface dissolving effect on the foil brought about by the paste which leads to a homogenous combination of the individual layers. Only those places that are necessary for joining the foils are coated with laminated paste. Thus the portions that are stamped out can be returned to the process and mixed in with the pour slip.

In the event of a particularly complex arrangement of recesses or hollow chambers, the individual foils or cards can be impressed at temperatures of up to 100° C. and pressures of up to 50,000 MPa.

The building up of the slip rings takes place by stacking the individual foils or cards, one on top of the other. The individual foils do not necessarily have to be of the same material; in particular the covering foils on the sliding surfaces can contain a further material component such as, for example, graphite which will lead to a lower coefficient of friction.

Once it has been removed from the laminating press, the stacked sliding ring is subjected to thermal treatment at between 100° and 200° C. This drives off the organic components, particularly the softener and the laminating agent. The heating process lasts one to two days, and 40 to 60% of the organic components will be driven off from the solid body. Subsequently the sliding body can be machined by milling or sawing so that it reaches its final dimensions. In the timeframe of approximately 2 to 3 days the residual content of organic components will be driven off by heating at temperatures between 200° and 300° C. When this is done a part of the binder will be converted to residual carbon, which will later contribute to the quality of the solid body. This is followed by siliconisation, i.e. the conversion of 10%-wt C to secondary SiC, and the filling of the residual porosity with metallic Si at 1450° to 1800° C. The very finely divided secondary carbide that evolves during the siliconisation process consolidates the original structure and makes a considerable contribution to the stability of the material and to its outstanding frictional characteristics. The remaining non-reacting portion of the free silicon remains as such in the material that is thus free of pores. The result of this process is a homogenous, one piece sliding body which is characterised by very even strength. The sliding body will then be ground, lapped or polished according to subsequent use.

We claim:

1. An annular sliding body for use in a sliding seal in which sliding surfaces of a sliding component and a counter component form a gap for fluid therebetween, said sliding body constituting one of said sliding component and said counter component and having a sliding surface on an axial face thereof formed by a thin flexible ceramic membrane layer, said sliding body further having arranged therein immediately beneath said flexible membrane layer at least one chamber extending only part way around the circumference of said sliding body and at least one radially extending solid portion supporting said membrane layer under part of the circumference of said sliding body; said membrane layer being elastically deformable above said chamber in a direction perpendicular to said sliding surface, so that a hydrodynamic effect may be produced.

2. A sliding body according to claim 1, wherein a plurality of chambers separated by a plurality of radially extending solid portions are arranged immediately beneath said flexible membrane layer.

3. A sliding body according to claim 1, wherein said membrane layer is a stamped foil and is laminated onto a base body in which said at least one chamber is formed.

4. A sliding body according to claim 3, wherein said membrane layer is a stamped ceramic foil.

5. A sliding body according to claim 1, wherein said membrane layer has areas that are thinner and areas that are thicker than its average thickness.

6. A sliding body according to claim 1, wherein hydrodynamic enhancement depressions are arranged on said sliding surface.

7. A sliding body according to claim 1, wherein said sliding body comprises a monolithic base body containing said at least one chamber, and said flexible membrane layer.

8. A sliding body according to claim 1, wherein said sliding body comprises a plurality of stacked thin form elements bonded together solidly at contact faces.

9. A sliding body according to claim 8, wherein said body is configured as one of a sliding ring and a counter ring of a sliding ring-type seal, and said thin form elements are foil rings of equal internal but various external diameters positioned coaxially around a central axis.

10. A sliding body according to claim 8, wherein said chamber is formed by cut-outs in the thin form elements.

11. A sliding body according to claim 8, wherein said chamber is formed by depressions impressed in the thin form elements.

12. A sliding body according to claim 8, wherein said chamber is configured as a circular ring segment and is formed by a ring of smaller diameter and a ring of larger diameter arranged concentrically around a central axis with a radially extendinng solid portion therebetween.

13. A sliding body according to claim 8, wherein said sliding body comprises a plurality of chambers defined by a plurality of cut-out portions formed so as to lie in one plane and separated from one another by radially extending solid portions.

14. A sliding body according to claim 8, wherein said sliding body comprises a plurality of chambers formed of a plurality of superimposed and interconnected rings comprising aligned solid portions superimposed on one another.

15. A solid body according to claim 8, wherein said sliding body comprises a plurality of chambers and having inlet and outlet openings for a fluid.

16. A sliding body according to claim 8, wherein said sliding body comprises a plurality of chambers arranged in tier fashion one above the other separated from one another by intervening separator rings.

17. A sliding body according to claim 16, wherein the separator rings are provided with openings forming a passageway between said chambers for passage of a fluid.

18. A sliding body according to claim 17, having a plurality of chambers arranged in tier fashion one above the other, wherein the openings in successive separator rings are displaced in a circumferential direction so as to lie at the right or at the left hand side, respectively, of a radially extending solid portion of a chamber ring so that the inlet and outlet openings are at opposite ends of the chambers.

19. A sliding body according to claim 8, wherein the thin form element forming the sliding surface is provided with hydrodynamic enhancement depressions.

20. A sliding body according to claim 19, wherein said thin form element forming the sliding surface is a ring.

21. A sliding body according to claim 8, comprising:
at least one component having a plurality of compound rings of the same shape, forming a first compound ring packet,
a second ring packet contiguous to and coaxial with said first ring packet comprising a first ring with an inlet opening, a sequence of interspersed chamber-forming segmented rings with at least one solid portion and at least two rings each having a through hole, said sequence ending in a ring with a through hole, all rings of said second ring packet having the same internal and external diameters, said external diameter of the rings of said second ring packet being smaller than the external diameter of the rings of the first ring packet, a final segmented ring having an outlet opening on said sequence ending through hole ring, a solid ring on said final segmented ring, and a thin form element which forms the sliding surface of said sliding body on said solid ring,
wherein the through holes in successive through hole rings are displaced in a circumferential direction so as to lie at the right or at the left hand side, respectively, of the solid portion of an interposed chamber-forming segmented ring so that the inlet and outlet openings formed by the through holes are at opposite ends of the chamber formed by said interposed segmented ring.

22. A sliding body according to claim 8, wherein said thin form elements consist of ceramic material.

23. A sliding body according to claim 1, consisting entirely of stacked and laminated thin form elements stamped from foils.

24. A sliding body according to claim 23, wherein said body is configured as one of a sliding ring and a counter ring of a sliding ring-type seal, and said thin form elements are foil rings of equal internal but various external diameters positioned coaxially around a central axis.

25. A sliding body according to claim 1, comprising a base body in which a plurality of chambers are arranged in one plane each having an inlet opening and an outlet opening for a fluid.

26. A sliding body according to claim 1, comprising a base body having radially open cut-outs which are covered axially by the membrane layer.

27. A sliding body according to claim 26, wherein ribs are provided between the membrane layer and the base of the cut-outs.

28. A sliding body according to claim 27, wherein said ribs protrude radially outwardly beyond the sliding body.

29. A sliding body according to claim 1, wherein pegs are provided that protrude radially outwardly from the sliding body.

30. A sliding body according to claim 1, comprising a surface supporting element in at least one of said chambers.

31. A sliding body according to claim 1, wherein at least one chamber has a structural element arranged therein between the membrane layer and an opposing surface of the chamber.

32. A sliding body according to claim 31, wherein said structural element comprises an electronic component.

33. A sliding body according to claim 31, wherein said structural element is a sensor.

34. A sliding body according to claim 31, wherein said structural element comprises an electromagnet.

35. A process for using a ceramic sliding body for a sliding seal having a sliding surface at one end formed by a flexible ceramic membrane covering at least one chamber in said body extending part way around the circumference of said body, said ceramic sliding body defining together with a counter component a gap in which there is a fluid, said process comprising elastically deforming said flexible ceramic membrane in a direction perpendicular to said sliding surface to produce a hydrodynamically enhanced spacial form on the sliding surface.

36. A process according to claim 35, wherein depressions and elevations are produced in said ceramic membrane by means of a pressure differential between said chamber and said sliding surface.

37. A process according to claim 36, wherein said pressure differential is varied over time.

38. A process according to claim 35, wherein depressions and elevations are produced in said ceramic membrane by means of a difference in external pressure on both sides of the seal.

39. A process according to claim 38, wherein said pressure difference is varied over time.

40. A process according to claim 35, wherein said deformation is produced by a pressure difference resulting from a change in temperature of a material in said chamber.

41. A process according to claim 35, wherein said deformation is produced by an electromagnet located in said chamber.

* * * * *

UNITED STATES PATENT AND TRADEMARK OFFICE
CERTIFICATE OF CORRECTION

PATENT NO. : 4,714,257
DATED : December 22, 1987
INVENTOR(S) : Juergen HEINRICH et al.

It is certified that error appears in the above—identified patent and that said Letters Patent is hereby corrected as shown below:

On the Title Page, Item [73], "Ceramtec" should read
-- CeramTec --.

Signed and Sealed this

Twenty-fifth Day of October, 1988

*Attest:*

DONALD J. QUIGG

*Attesting Officer*   *Commissioner of Patents and Trademarks*